June 23, 1925.

C. W. RUCKSTUHL

CANE JUICE SETTLING TANK

Filed May 8, 1923     2 Sheets-Sheet 1

1,543,621

INVENTOR
Charles W. Ruckstuhl
BY James J. Sheely & Co.
ATTORNEYS

June 23, 1925.
C. W. RUCKSTUHL
1,543,621
CANE JUICE SETTLING TANK
Filed May 8, 1923
2 Sheets-Sheet 2
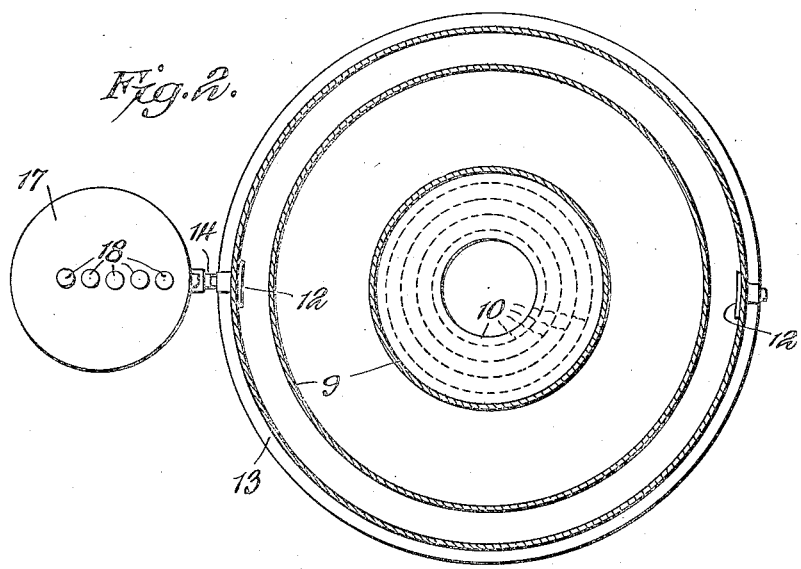
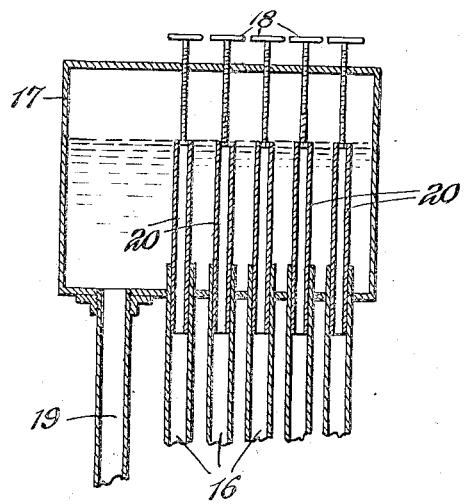
INVENTOR
Charles W. Ruckstuhl
BY James J. Sheehy
ATTORNEYS 1,543,621

UNITED STATES PATENT OFFICE.

CHARLES W. RUCKSTUHL, OF NEW ORLEANS, LOUISIANA, ASSIGNOR OF ONE-HALF TO LEONIDAS E. GOUNER, OF NEW ORLEANS, LOUISIANA.

CANE-JUICE-SETTLING TANK.

Application filed May 8, 1923. Serial No. 637,600.

*To all whom it may concern:*

Be it known that CHARLES W. RUCKSTUHL, a citizen of the United States, residing at New Orleans, in the parish of Orleans and State of Louisiana, have invented new and useful Improvements in Cane-Juice-Settling Tanks, of which the following is a specification.

My present invention pertains to cane juice settling tanks, and it contemplates the provision of a simple and inexpensive device having a series of shelves so constructed and arranged that a larger settling surface is provided in a smaller tank unit.

The invention also contemplates the provision of a settling tank that permits of the ready withdrawal of the clear juices and at the same time allows removal of mud and sediment from the most inaccessible point of the tank, viz. the lower end thereof.

The invention further contemplates a tank for continuously separating fibre and other lighter substances as well as heavy foreign substances from saccharine liquids.

The invention in all of its details will be fully understood from the following description and claims when the same are read in connection with the drawings accompanying and forming part of this specification, in which:—

Figure 2 is a transverse sectional view of the settling tank, and level rending tank.

Figure 3 is a longitudinal sectional view of the tank for controlling the level of liquid in the settling tank.

Similar numerals of reference designate corresponding parts in all the views of the drawings.

Figure 1:
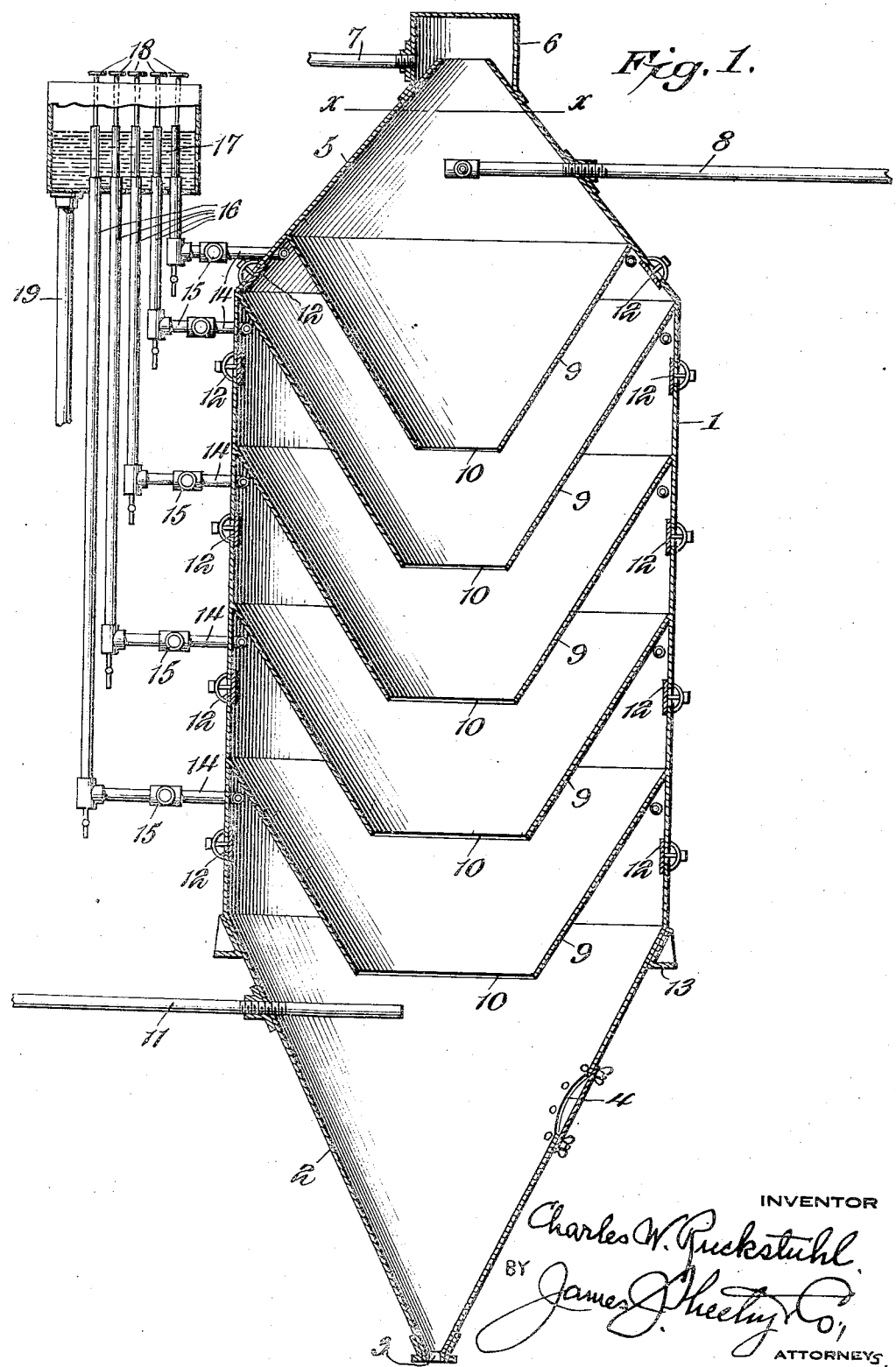
Figure 1 is a longitudinal sectional view of my novel settling tank and showing the level rending tank adjacent thereto.

My novel device comprises the cylindrical tank 1 that is of funnel shape in cross-section at its lower end 2 and at the ends of the funnel shaped portion 2 of the tank, I provide a mud outlet 3 and in the said funnel shaped portion of the tank I also provide a manhole cover 4 whereby access to the lower end of the tank may be had.

At its upper end the tank 1 is provided with the inverted funnel shaped portion 5. At its extreme upper end the tank is open and arranged over said opening is a scum over-flow trap 6 that has a scum outlet at 7. Adapted to enter the tank (preferably at the inverted cone-shaped portion 5) is a charge pipe 8 that is in direct communication with a series of baffle plates 9. These plates 9 are open at their lower ends 10 and said plates are permanently secured to the walls of tank 1 and extend completely around the inner surface of the tank. These plates are of funnel shape construction in cross-section and the wall of each succeeding plate is arranged so as to produce a comparatively larger opening 10 at its base than the opening of the plate immediately above.

In order to permit the cleaning of the various shelves or baffle plates, I provide a number of hand-hole plates 12, as shown. A flange 13 is provided to permit the tank to rest upon a foundation.

A draw-off pipe 11 is provided in the portion 2 of the tank.

In the operation of settling tanks for manufacturing sugar, fermentation sets in and in order to prevent inversion, it becomes necessary after a period of approximately six days when using a settling tank of my novel construction to wash the tank. This necessitates the shutting down of the operation of the tank and in order to wash the tank it must be emptied or liquidated, and such liquidation is accomplished by means of the pipe 11.

The side walls of the tank 1 are provided with outlets that communicate with the spaces between each baffle plate 9 and said outlets are in direct communication with the pipes 14 having cut-offs 15 and said pipes 14 terminate in pipes 16 that enter the tank 17. By reference to Figure 3 it will be seen that in order to prevent the juices from leaving tank 17 in any other way than through the clear juice outlet 19, the pipes 16 are provided with extensions 20 and said extensions in turn are provided with the members 18.

In the practical use of the tank the charge of dirty juice enters the tank under pressure through pipe 8, the tank being constantly maintained nearly full with liquor, during its operation. The dirty juice flowing downward, the mud and heavier particles continuing down through openings 10, while the clear juice starts up under plate 9 toward outlets 14. The gums, waxes and lighter particles are carried to the surface of the liquid, which is maintained somewhere in the neighborhood of the line X, and from there is carried over into scum collector 6. The clear juice passes through pipes 14 and 16 then up through sleeves 20 overflowing into tank 17. The clear juice is drawn from 17 as fast as it enters by clear juice outlet 19.

In order to maintain the surface of juice at line X so that waxes and scums will push themselves out over the top into scum collector 6, the sleeves 20 are raised or lowered, thereby regulating the head pressure between the two levels. It can easily be seen that by raising the sleeves 20 and thereby bringing the overflow to a higher level the surface X in the tank will be raised correspondingly. One of the most important features of the settling tank is the taking care of the scum. By maintaining the juice at a level X the gum and scums collecting on the top will be continuously working over the top of the inverted cone 5, and the steam from the hot juice will bubble up and carry a great portion of the scum over with it. When it becomes necessary to overflow the tank the sleeves 20 are raised sufficiently to cause this overflow. It can be seen that the tank allows of a steady discharge which can be regulated at any time in order to maintain a proper level in the settling tank.

Further, it may be seen that the juice flowing from one outlet is slightly dirty due to the too speedy operation in this one compartment. In this case the sleeve 20 which regulates the flow from this particular compartment will be raised in order to make the flow a little slower. In this way each compartment between the baffle plates 9 can be correctly regulated to their respective capacities and the whole regulated so as to maintain level X in the tank at the proper point.

It will be manifest that a tank constructed along the lines specified is simple and inexpensive to produce, maintain and operate and that cleaning of the tank is a simple matter. Moreover, the construction of inclined baffle plates increases the speed of settling by decreasing the distance particles must fall. In other words the vertical distance between the plates is such that a short fall takes place and the mud forming on the plates compacts and falls more readily than if the plates were otherwise constructed.

I would distinctly have it understood that I do not wish to be confined to the placing of my novel plate construction in any particular form of outer tank and I reserve the right to make such changes or modifications in the construction of my settling elements as fairly falls within the scope of the claim appended.

I would also distinctly have it understood that I do not wish to be confined to the use of the above described settling tank, to only cane juice settling.

In the operation of settling tanks fermentation takes place almost immediately and in order to overcome this it will be noted that my novel tank removes the scum, wax, and other elements that tend to cause fermentation, continuously. In the ordinary construction of settling tanks this fermentation is carried downwardly and the density of a portion of this fermentation is the same as the clear juices that are drawn off in a two-way separator and the remaining portion is carried downwardly. In my novel tank the fermentation is removed in its light stage and is entirely eliminated from the tank by the action of the air that is contained in the liquor when it is forced into the collecting member.

Having described my invention, what I claim and desire to secure by Letters-Patent is:—

In a settling tank, the combination of a circular casing, a series of funnel-shaped plates arranged one above the other within the casing and connected along their upper edges to the walls of said casing whereby a series of compartments are formed with their bottoms pitched at such an angle as to permit of discharge solely by gravity of solids deposited thereon; said plates being open at their lower ends and having said openings in aline with each other, the opening of each succeeding plate being slightly larger than that of the preceding plate, vents arranged in each of the compartments, a scum trap mounted on the upper end of the casing and having an overflow pipe therein, a tank arranged adjacent the casing, pipes communicating with the compartment vents and also with the tank, sleeves for vertical adjustment arranged in one end of the pipes for controlling the flow of liquid from the compartments, an inlet pipe mounted above the upper funnel-shaped plate and entering the casing, a mud outlet arranged in the lower end of the casing and a draw-off pipe arranged in the casing adjacent the lower end of the lowermost funnel-shaped plate.

In testimony whereof I have hereunto set my hand in presence of two subscribing witnesses.

CHARLES W. RUCKSTUHL.

Witnesses:
L. E. GOUNER,
J. LAUNES.